United States Patent
Lin et al.

(10) Patent No.: US 10,892,974 B2
(45) Date of Patent: Jan. 12, 2021

(54) AUTOMATIC PROTOCOL TEST METHOD BY REVERSE ENGINEERING FROM PACKET TRACES TO EXTENDED FINITE STATE MACHINE

(71) Applicant: NATIONAL CHIAO TUNG UNIVERSITY, Hsinchu (TW)

(72) Inventors: Ying-Dar Lin, Hsinchu (TW); Quan-Bui Tien, Ha Noi (VN); Yu-Kuen Lai, Chung-Li (TW); Yuan-Cheng Lai, Taipei (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 7 days.

(21) Appl. No.: 16/402,004

(22) Filed: May 2, 2019

(65) Prior Publication Data

US 2020/0351191 A1 Nov. 5, 2020

(51) Int. Cl.
*G06F 15/173* (2006.01)
*H04L 12/26* (2006.01)

(52) U.S. Cl.
CPC ........... *H04L 43/50* (2013.01); *H04L 43/028* (2013.01); *H04L 43/18* (2013.01)

(58) Field of Classification Search
CPC ......... H04L 1/243; H04L 29/06; H04L 43/18; H04L 43/50; H04L 63/1433; H04L 63/08; G06F 8/53; G06F 11/3684; G06F 16/23; G06F 21/566; G06F 21/554; G06N 20/00
See application file for complete search history.

(56) References Cited

U.S. PATENT DOCUMENTS

| | | | |
|---|---|---|---|
| 6,373,822 B1* | 4/2002 | Raj | H04L 1/243 370/241 |
| 7,369,507 B1* | 5/2008 | Musial | H04L 29/06 370/244 |
| 2009/0006645 A1* | 1/2009 | Cui | H04L 43/50 709/236 |
| 2009/0254891 A1* | 10/2009 | Cui | G06F 8/53 717/138 |
| 2013/0339377 A1* | 12/2013 | Iwama | G06F 16/23 707/758 |
| 2014/0013382 A1* | 1/2014 | Pellegrino | H04L 63/1433 726/1 |
| 2015/0205963 A1* | 7/2015 | Zou | G06F 21/566 726/23 |
| 2015/0363215 A1* | 12/2015 | Versteeg | G06F 11/3684 703/23 |
| 2017/0019312 A1* | 1/2017 | Meyer | G06N 20/00 |
| 2018/0124080 A1* | 5/2018 | Christodorescu | G06F 21/554 |
| 2019/0260631 A1* | 8/2019 | Schmeelk | H04L 43/18 |
| 2020/0137021 A1* | 4/2020 | Janakiraman | H04L 63/08 |

* cited by examiner

*Primary Examiner* — Dustin Nguyen

(74) *Attorney, Agent, or Firm* — McClure, Qualey & Rodack, LLP

(57) ABSTRACT

An automatic protocol test method by reverse engineering from packet traces to extended finite state machine is disclosed. The method includes following steps: parsing the plurality of packets to extract a plurality of sessions; conducting a keyword analysis and a clustering algorithm to obtain protocol messages; initializing the protocol messages and merging equivalent states to obtain a finite state machine; extracting fields and values of the protocol messages to obtain a plurality of sub-datasets and adding a data guard and set of memories on the finite state machine to obtain the extended finite state machine.

9 Claims, 8 Drawing Sheets

AUTOMATIC PROTOCOL TEST METHOD BY REVERSE ENGINEERING FROM PACKET TRACES TO EXTENDED FINITE STATE MACHINE

BACKGROUND OF THE INVENTION

1. Field of the Invention

The present disclosure generally relates to an automatic protocol test method, and in particular, to the automatic protocol test method to obtain a protocol specification by reverse engineering from packet traces to an Extended Finite State Machine (EFSM).

2. Description of the Related Art

The protocol specification is helpful to the network detection systems and is essential for the development of protocol fuzzer and test case generation tools. The intrusion detection systems typically rely on the parser to perform deep packet inspection based on the protocol specification. In testing domain, the smart fuzzers need to have knowledge to generate right messages at right states. The vulnerability discovery tools also leverage on the protocol behavior models to produce illegitimate and unexpected patterns. However, obtaining protocol specification is a tedious and time-consuming task. Even for the open protocols, it takes times to analysis and translate the open document to formulate the behavior model. Therefore, automated protocol reverse engineering has been proposed recently with intention of specification inference.

The methods of protocol reverse engineering can be classified into two directions based on the input, execution trace (application inference), and network trace (network inference). The application inference is hard to perform due to the un-availability of source codes. Most of the time, only network traffic is available for the analysis of the malware and botnet at Internet Service Provider's side. The network inference method can only rely on the protocol traces to actively reconstruct the behavior model and infer protocol message formats with significant accurate results. However, the conventional reverse engineering only focus on the control flow without considering the data flow.

The known protocol reverse engineering techniques have the limitation and shortcomings. Hence, the inventor provides the automatic protocol test method by reverse engineering from packet traces to extended finite state machine, so as to resolve the drawbacks and promote the industrial practicability.

SUMMARY OF THE INVENTION

In view of the aforementioned technical problems, one objective of the present disclosure provides an automatic protocol test method by reverse engineering from packet traces to extended finite state machine, which is capable of considering both the control layer and the data layer of the protocol messages, so as to provide the more powerful and suitable models for security and testing application.

In accordance with one objective of the present disclosure, an automatic protocol test method by reverse engineering from packet traces to extended finite state machine (EFSM) is provided. The automatic protocol test method includes the following steps of inputting traffic traces containing a plurality of packets in sequence; parsing the plurality of packets to extract a plurality of sessions and reconstructing the plurality of sessions to obtain protocol messages; conducting a keyword analysis and a clustering algorithm to the protocol messages to identify a plurality of message types; initializing the protocol messages to form initial session sequences and merging equivalent states to obtain a finite state machine (FSM) with a set of states, a set of transitions, a set of inputs and a set of outputs; extracting fields and values of the protocol messages to obtain a plurality of sub-datasets and adding constraints on the fields to generate a data guard, the data guard and set of memories being inferred on the finite state machine to obtain the extended finite state machine.

Preferably, the plurality of packets may be parsed according to a source address, a source port, a destination address, a destination port and a type of transport layer protocol.

Preferably, the keyword analysis may include an Apriori keyword analysis to find high frequency and close sequence string.

Preferably, the clustering algorithm may include a K-means clustering algorithm based on distances.

Preferably, the initial session sequences may be arranged with different paths by a Prefix Tree Acceptor.

Preferably, the equivalent states may be merged by same k-tail transitions.

Preferably, the protocol messages may be processed by a Needleman and Wunch sequence alignment to extract the fields.

Preferably, the values of the fields in the protocol messages may be hold over by a Daikon algorithm to infer the constraints Preferably, the constraints on the fields may include checking valid value of the fields, intra-message dependencies and inter-message dependencies.

As mentioned previously, the automatic protocol test method by reverse engineering from packet traces to extended finite state machine in accordance with the present disclosure may have one or more advantages as follows.

1. The automatic protocol test method is capable to infer the behavior models of network protocols by leveraging efficient reverse engineering technique and only requires the network traces to reconstruct the faithful models, so that the method can be widely used in different finds of network protocols.

2. The automatic protocol test method may cover both the control flow and the data flow of the protocol messages to improve the quality of protocol fuzzers or test case generation tool, so as to provide the more powerful and suitable models for security and testing application.

3. The automatic protocol test method may consider the inter message dependencies and intra message dependencies, so that the memory size for saving the message data can be reduced to provide the efficient operation.

DETAILED DESCRIPTION OF THE PREFERRED EMBODIMENTS

In order to facilitate the understanding of the technical features, the contents and the advantages of the present disclosure, and the effectiveness thereof that can be achieved, the present disclosure will be illustrated in detail below through embodiments with reference to the accompanying drawings. On the other hand, the diagrams used herein are merely intended to be schematic and auxiliary to the specification, but are not necessary to be true scale and precise configuration after implementing the present disclosure. Thus, it should not be interpreted in accordance with the scale and the configuration of the accompanying drawings to limit the scope of the present disclosure on the practical implementation.

In accordance with the embodiment(s) of the present invention, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other know types of program memory.

Figure 1:
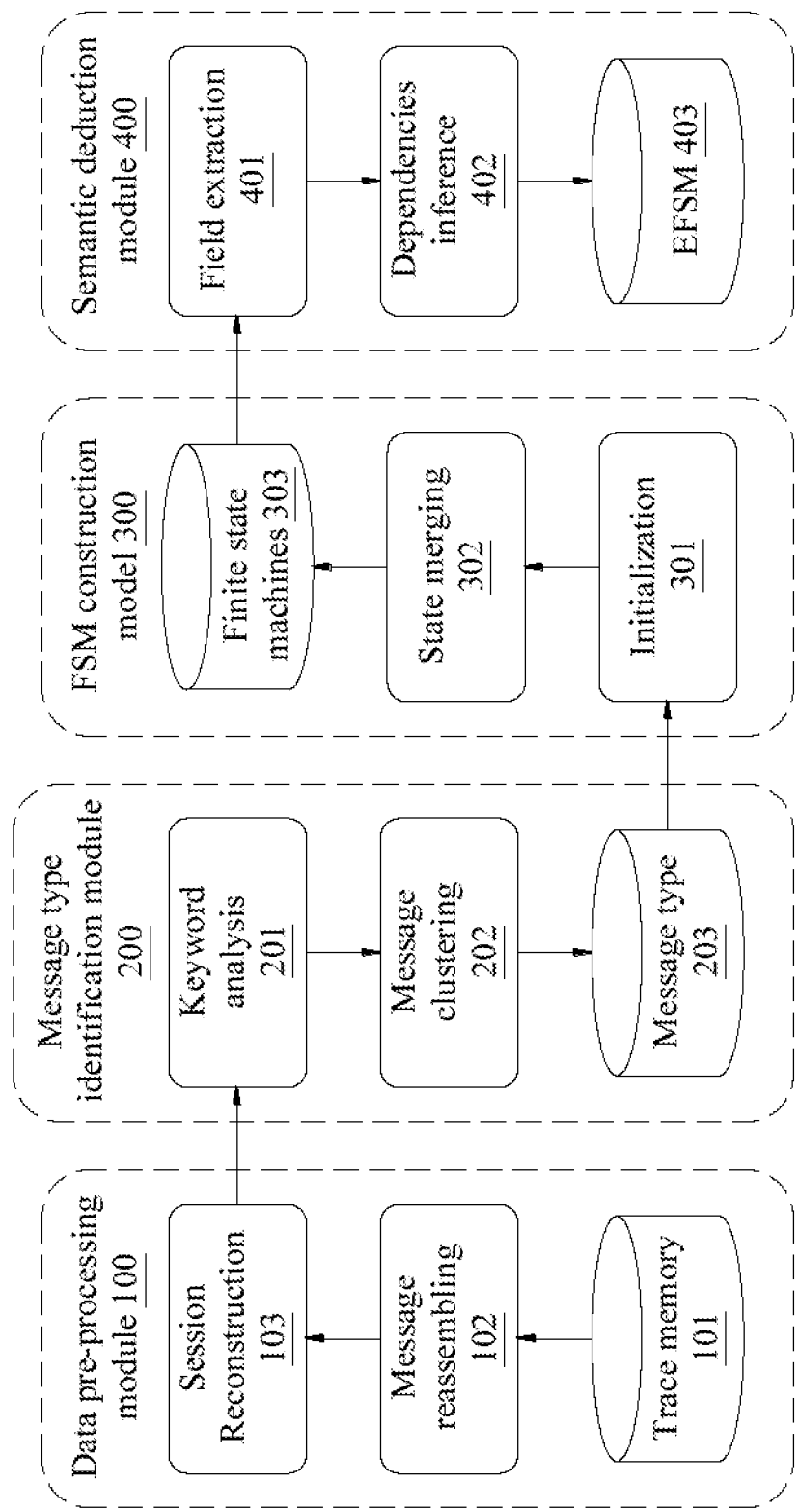
FIG. 1 is a schematic diagram illustrating the processing model of the automatic protocol test method in accordance with the present disclosure.

FIG. 1 is a schematic diagram illustrating the processing model of the automatic protocol test method in accordance with the present disclosure. As shown in the figure, The processing model includes data pre-processing module 100, message type identification module 200, FSM construction model 300 and semantic deduction module 400. The above modules may be programed and saved in the memory device of the computer or in the cloud server. When conducting the automatic protocol test method, the processor may execute the command and access the above models to process the present method.

At first, data pre-processing module 100 collects the traffic traces and saves in the trace memory 101. The traffic traces of a particular protocol have to be preprocessed by steps of message reassembling 102 and session reconstruction 103 including extracting and cleaning. The message type identification module 200 uses a keyword analysis 201 to extract protocol keywords and uses a message clustering 202 to cluster message into groups by a distance based algorithm. Each group is considered as a different message type 203. The results are further fed to FSM construction module 300 to infer the finite state machine (FSM) 303 by using the initialization 301 and state merging 302 algorithms. After the correct FSM 303 is inferred, the semantic deduction module 400 provides field extraction 401 to extract sub-datasets containing values of message fields in observed messages. Further analysis is performed by dependencies inference 402 to search correlation of fields in messages and deduce to form the data guards on each transition. The data guards on each transition and the set of the memory are merged in the FSM 303 to obtain an extended finite state machine (FFSM) 403. The detail description of each model will be presented by the following embodiments.

Figure 2:
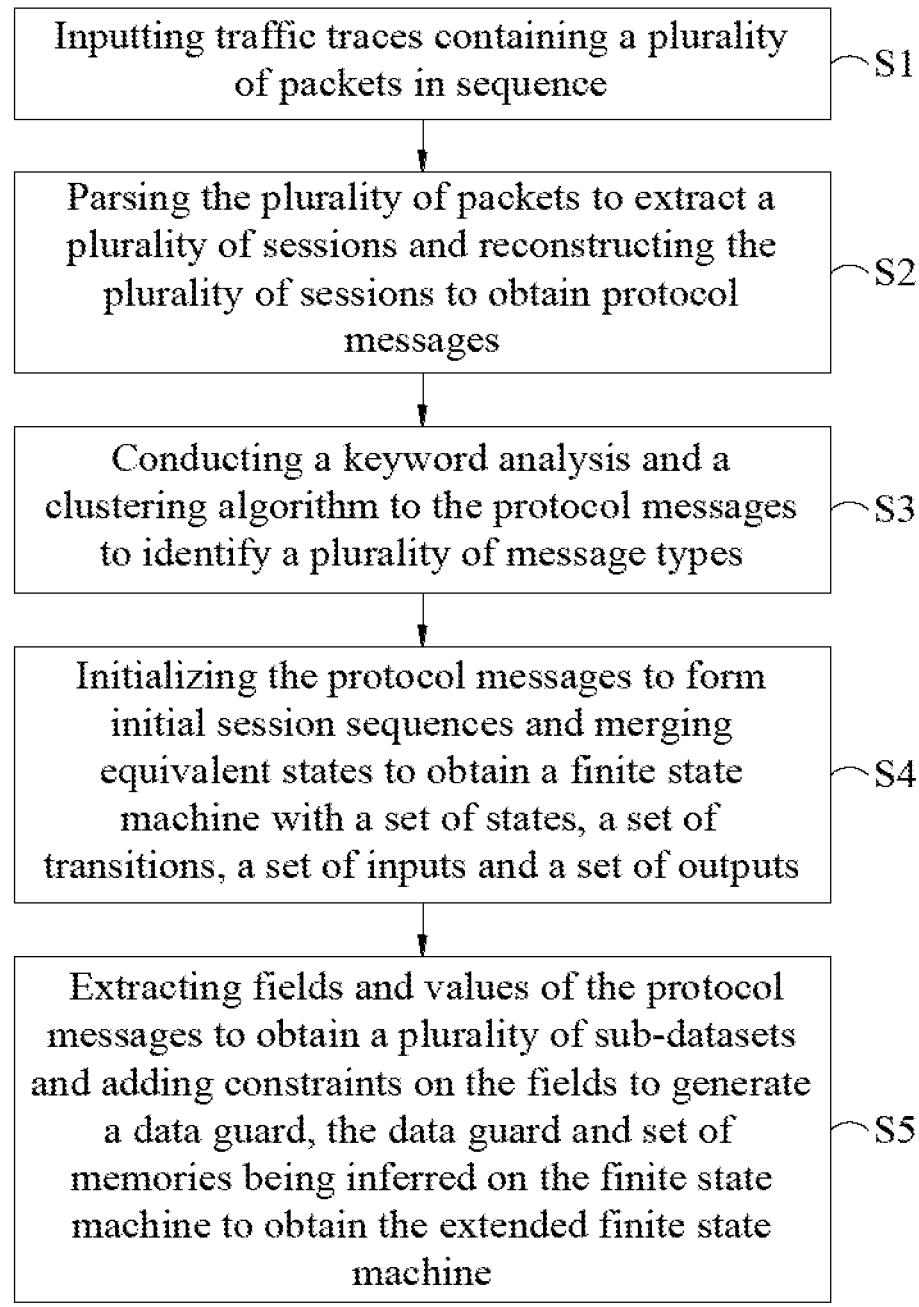
FIG. 2 is a flow chart of the automatic protocol test method in accordance with the present disclosure.

FIG. 2 is a flow chart of the automatic protocol test method in accordance with the present disclosure. As shown in the figure, the method includes the following steps (S1-S5).

Step S1: Inputting traffic traces containing a plurality of packets in sequence. Please referring the process models mentioned in FIG. 1, the data pre-processing module 100 can process traffic traces in various forms such as TCP dump files or pcap, pcapng. In the present embodiment, the module takes traffic traces from TCP dump files as input. The traffic traces may be collected and saved in the memory of the computer for the following analysis.

Step S2: Parsing the plurality of packets to extract a plurality of sessions and reconstructing the plurality of sessions to obtain protocol messages. The messages are parsed to extract sessions based on 5-tuple: source address, source port, destination address, destination port and type of transport layer protocol. Then, the fragmented messages are assembled if needed, the duplicates and retransmissions are removed as well. The time-gaps heuristic can be used in case of missing fragmentation information. The remaining messages continue to be parsed to ignore the unrelated message, only the payloads which containing the information of target application protocol are kept to further analysis.

Step S3: Conducting a keyword analysis and a clustering algorithm to the protocol messages to identify a plurality of message types. To increase the quality of message type identification, the message type identification model 200 hybrid keyword analysis based approaches and distance-based approaches with the purpose of taking advantages to overcome the limitations of each other. The issues of threshold and keyword misperception are solved by an iterative k-means clustering based on the distance metric. The limitation of having the number of clusters in advance of k-means is attempted by extracted keyword series.

The keyword analysis 201 is performed first to discover the keywords of protocols which are frequent occurring strings. In the present embodiment, this component can employ an Apriori algorithm. However, the keyword based method is not limited in such algorithm. The Kohnogorov-Smirnov test, Statistical t-test and Distribution of Variances can be included in the present method. The Apriori keyword analysis is based on the modification of AutoReEngine to identify the keywords. Basically, the algorithm iteratively finds the high-frequent and close-sequence of bytes (or string) with stable position variance by the Apriori method. In each iteration, only closed sequences with frequency higher than a pre-defined threshold are retained and deliberated as keywords.

After the keywords extraction process, the keyword series observed in the dataset can be used as the distinguished format of message types. Each keyword series is a group. And the number of clusters is also determined before the k-means algorithm is performed. The distance metric is based on the Jaccard index defined as $$1 - \frac{|a \cap b|}{|a \cup b|}$$

where a, b are character array of messages.

The k-means clustering algorithm helps to calibrate the keyword extraction in first step. For instance, the string of "CWD /" is detected as a keyword because of the operation of a Linux file system. (most commands are having the form of "CWD /pub", "CWD /root", "CWD /conference" . . . ). Since "CWD /" is a keyword, the message "CWD lib" and "CWD acld.tar.gz" h are grouped into incorrect cluster and should be calibrated by the k-means clustering algorithm. In order to overcome the issue of missing keyword, the step keeps the undecided messages sets and repeats this process. Because the size of dataset is reduced, the keywords which have low frequency in the original dataset can be revealed.

Step S4: Initializing the protocol messages to form initial session sequences and merging equivalent states to obtain a finite state machine with a set of states, a set of transitions, a set of inputs and a set of outputs. The goal of this module is to infer the conventional FSM model with 4-tuple: (S, I, O, σ) before identifying the data guards with transition to complete the EFSM. The proposed methodology consists of two parts: FSM initialization from traces and states merging by GK-tail merging mechanism. The step may construct two FSMs, one for client and one for server. In this section, the process of the FSM model inference in the server side and client side is provided.

Figure 3:
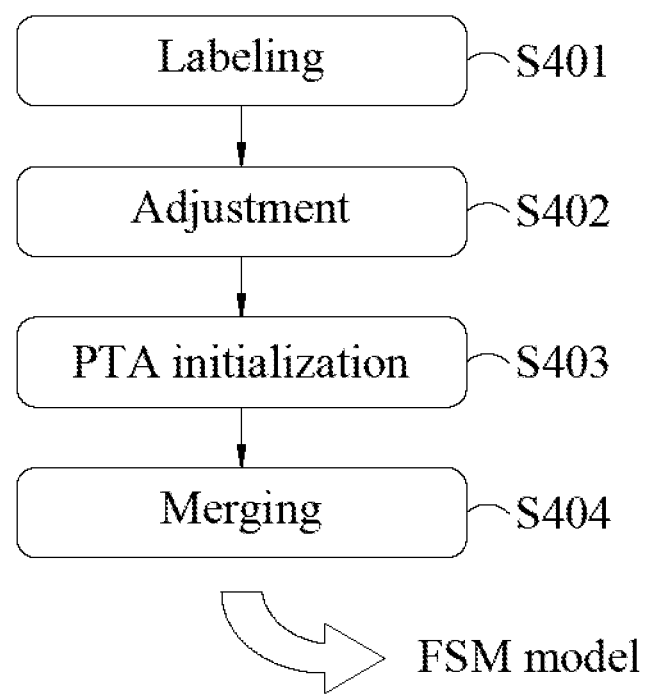
FIG. 3 is a flow chart of FSM construction model in accordance with the present disclosure.

FIG. 3 is a flow chart of FSM construction model in accordance with the present disclosure. As shown the figure, the FSM construction model includes the following steps (S401-S404):

Step S401: Labeling step. To achieve a better result of the FSM construction, dataset labeling and cleaning are conducted before processing. Since messages are grouped into isolated cluster, the labeling component names its cluster and represents the session as a sequence of label. If the message is requested by a client ($i_k$) and response message ($o_k$) is from a server, ($i_k$, $o_k \in$ T where T is set of message types) the session can be represented as a sequence of: Ses={($i_1$, $o_1$), ($i_2$, $o_2$) . . . ($i_m$, $o_m$)}.

Step S402: Adjustment step. Because traces are adopted from real world traffic, some sessions are incomplete (ex. packet loss) and some messages have ordering issues due to packet swapping and network delay. Thus, cleaning data techniques such as reorder sequence, missing value inference are applied to fix the missing messages. Taking an incomplete FTP session {(USER, 331), (PASS, x), . . . (QUIT, 500)} as an example, we can easily infer the missing value of "230" message base on the high frequency of pair (PASS, 230) in the dataset.

Figure 4:
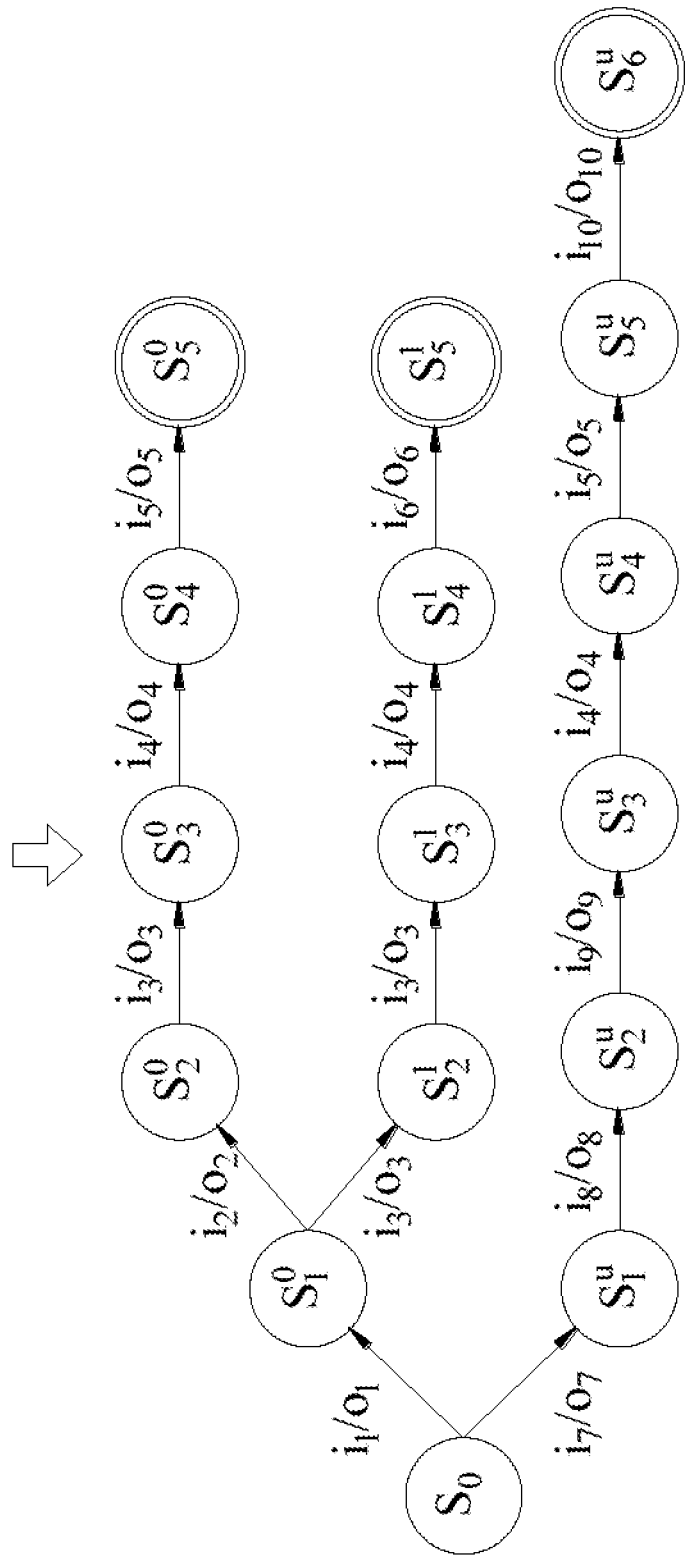
FIG. 4 is a schematic diagram illustrating the initial FSM obtained from session sequences in accordance with the present disclosure.

Step S403: PTA initialization step. In this step of processing, dataset is fed to the initialization module to build a Prefix Tree Acceptor (PTA) accepting all session sequences. For every session sequence, the process starts from the root and simply travels down along the tree. A new path is created if there are no existing paths. The PTA nodes set can be initial set of states, the label of messages are set of inputs and outputs. The initial set of transitions is collection of PTA transitions. Please refer to FIG. 4, which is a schematic diagram illustrating the initial FSM obtained from session sequences in accordance with the present disclosure. The sessions ($Ses_1$-$Ses_u$) are arranged by different paths by the PTA method.

Step S404: Merging step. The initial FSM is iteratively refined by merging equivalent states based on the K-tail mechanism. The intuition is that the protocol state machine always exposes the same behaviors at the same state. In other words, the machine will produce same outputs if same inputs are submitted at a certain state. Due to the deterministic characteristic of protocol state machines, the next states in k-tail of two equivalent states can be merged. Please refer to FIG. 5, which is flow chart of the merging algorithm in accordance with the present disclosure. The procedural is defined as following steps (S411-S415):

Step S411: Calculate k-tails(s) as the set of next transitions. For each every state s∈S, we define k-tails(s) as the set of next transitions.

Step S412: Initialize {$E_i$} a list set consists of equivalent states.

Step S413: Compare k-tails of pairs of states to initialize a list set consists of equivalent states.

Step S414: Merge $E_i \cup E_j$. Taking above list as input, two sets are merged iteratively if the two sets share at least one element until no two sets can be merged. At the end of this step, we obtain a list of sets consisting of equivalent states and no two sets consist of same state.

Step S415: Final set of states. For every set, a new state is created as representative of all states in the set. Then for every original transition, new transition is added between two new states which correspondingly are representative of from and end states of initial FSM.

Step S5: extracting fields and values of the protocol messages to obtain a plurality of sub-datasets and adding constraints on the fields to generate a data guard, the data guard and set of memories being inferred on the finite state machine to obtain the extended finite state machine. Since the FSM with 4 tuple (S, I, O, σ) is defined, we start to generate the data guards and memories (δ, M) on each transition to complete the EFSM with 6 tuple (S, I, O, σ, δ, M) of protocol. To this end, we investigate how the protocol implementation process the coming messages at certain state to produce responses. At first, the protocol implementation identifies the type of message and decomposes the messages into fields (or data). Then it checks the validation of values of each field to decide whether it performs further actions or not. For instance, the message "PORT 65, 240, 180, 205, 56, 56", the FTP server identifies that the request command is PORT then parses to get data (arguments) ("65, 240, 180, 205, 56, 56") including first four numbers are encoding of IP address and the remaining are encoding of port number. The FTP server checks the constraints hold over these number is range of (0, 255) hold over these numbers. A field extraction is adopted to then build the sub-dataset containing all values of fields before EFSM uses Daikon to infer the constraints hold over all values of certain field.

Figure 5:
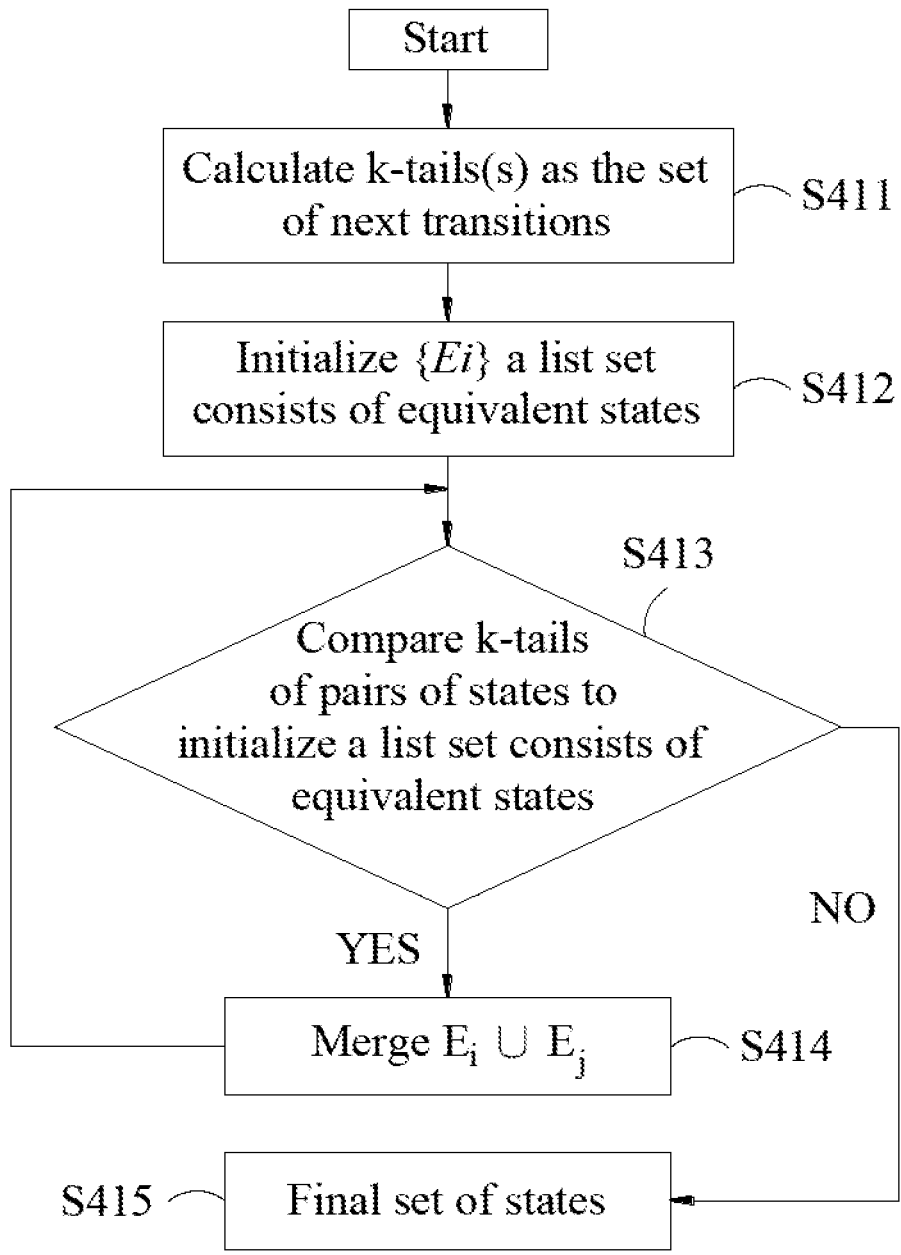
FIG. 5 is a flow chart of the merging algorithm in accordance with the present disclosure.
Figure 6:
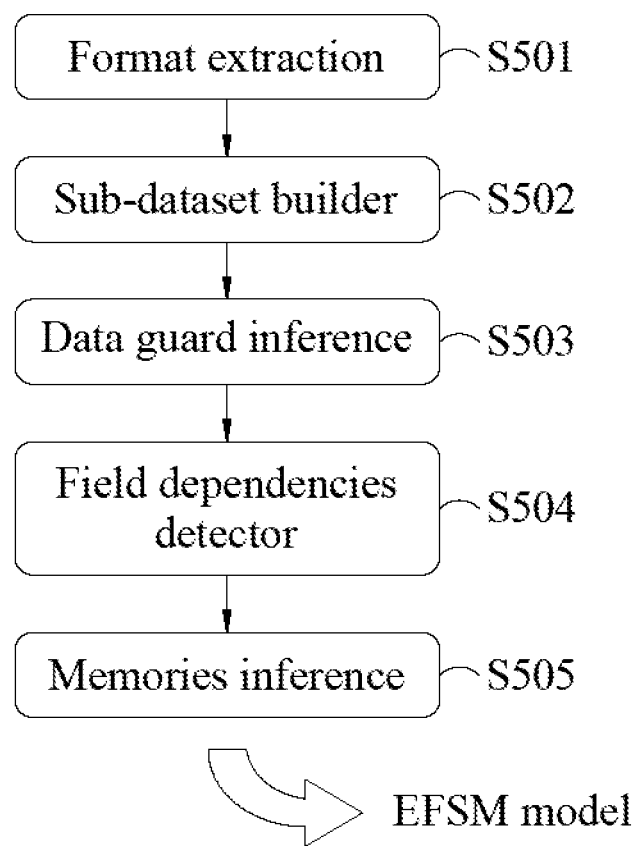
FIG. 6 is a flow chart of the Semantic deduction module in accordance with the present disclosure.

Please refer to FIG. 5, which is a flow chart of the Semantic deduction module in accordance with the present disclosure. The process includes the following steps (S501-S505):

Step S501: Format extraction. The format extraction step is to infer the message formats of protocols from message clusters. The format of each message type is inferred to obtain fields and prepared the sub-dataset consisting of valid value for each field. An exemplary implementation of automatic reverse engineering of messages format is the multiple Needleman and Wunsch (N&W) sequence alignment algorithm. Due to the high computational complexity of original Multiple N&W, a progressive alignment based on a pre-built guide tree to decide the order is used fir the alignment process. The results are composed of a consensus string, reveals dynamic fields and static fields. The static fields are mostly like protocol keyword series which we extracted before.

Step S502: Sub-dataset builder. The sub-dataset builder step is to build the sub-dataset for each field which contains the valid values by extracting from original traces.

Figure 7:
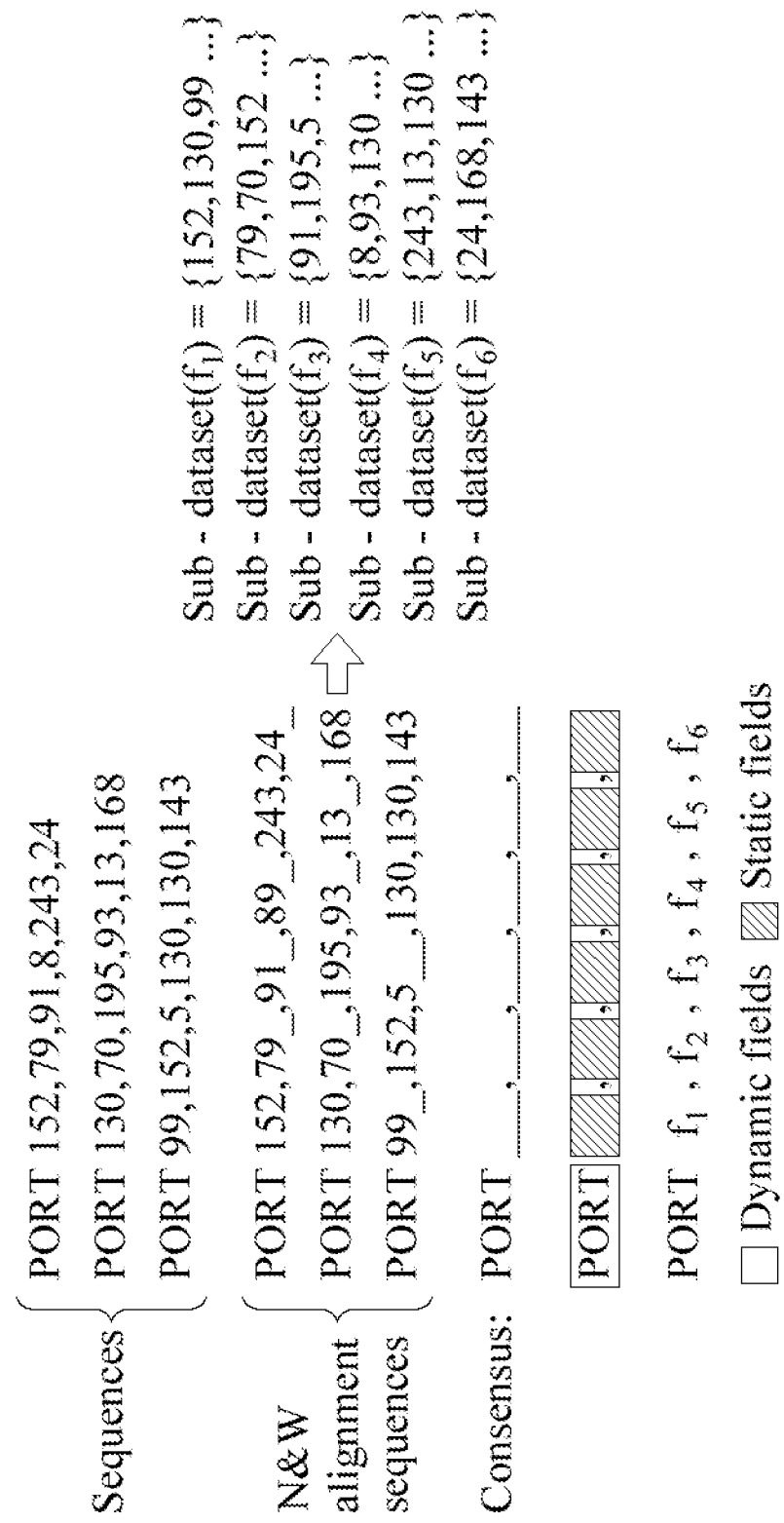
FIG. 7 is a schematic diagram illustrating the Needleman and Wunsch sequence alignment algorithm in accordance with the present disclosure.

The sub-dataset for each dynamic field is built by obtaining all observed values in the traces and grouping by the response message type. An illustrated example of PORT message alignment is given in FIG. 7, which is a schematic diagram illustrating the Needleman and Wunsch sequence alignment algorithm in accordance with the present disclosure. As shown in the figure, the left hand side are messages in traces and the N&W alignment progress, the right hand side are sub-dataset of each field according from traces corresponding response code of "200". Hereafter, sub-datasets of fields are mined to deduce the protocol semantic.

Step S503: Data guard inference. The data guard inference step can take the sub-dataset as input to deduce the constraints on each field. These constraints are considered as parts data guard on the transition of EFSM model. An exemplary algorithm for this component is Daikon. Daikon can deduce a large set of values in sub-dataset into a simpler invariant which can be utilized as a data guard.

Since messages are dissected, we assume that the message i consists of field f, i=[$f_1$, $f_2$, ... $f_t$]. As mentioned before, the data guards act as predicates on input message. Then we can approximately define data guard function as follow:

$$\delta(i, m) =$$

$$\delta(f_1, f_2, \ldots f_k, m) \approx \bigwedge_{1}^{t} Pr_u(f_u) \, \& \, \bigwedge_{1}^{t} Itr_{uv}(f_u, f_v) \, \& \, \bigwedge_{1}^{t} Ite_u(f_u, m)$$

The parameters are listed as follows:
$Pr_u(f_u) \rightarrow \{0,1\}$ is a data predicate of field $f_u$ for data validations. This function checks whether the value of field is valid or not. It partly represents the syntax of the field.

$Itr_{uv}(f_u, f_v) \rightarrow \{0, 1\}$ is a constraint between values of two fields $f_u$, $f_v$, or intra-message dependencies.

$Ite_u(f_u, m) \rightarrow \{0,1\}$ is a constraint between value of field $f_u$ and the memories m which are stored in previous message. It is the inter-messages dependencies.

To better understand the process, we look at some examples of each category of constraint. The IP address and port number format in the argument of FTP's PORT command are regular expressions of the first type. The checksum and direction fields such as length and offset are the intra-messages dependencies, and the cookies (in HTTP protocol) are inter-messages dependencies. Since data guard is reformed approximately, the proposed method generally spawns the data predicate of a field and search for inter/intra messages dependencies bases on the traces.

EFSM relies on the Daikon algorithm to generate the data guard of each field. Daikon deduces a large set of values in sub-dataset into a simpler invariant which EFSM can be utilized as a data guard. Thus, our data predicate of a field is defined as follow:

$$Pr_u(v) = \begin{cases} 1 \text{ if } v \in \text{Daikon}(f_u) \\ 0 \end{cases}$$

Figure 8:
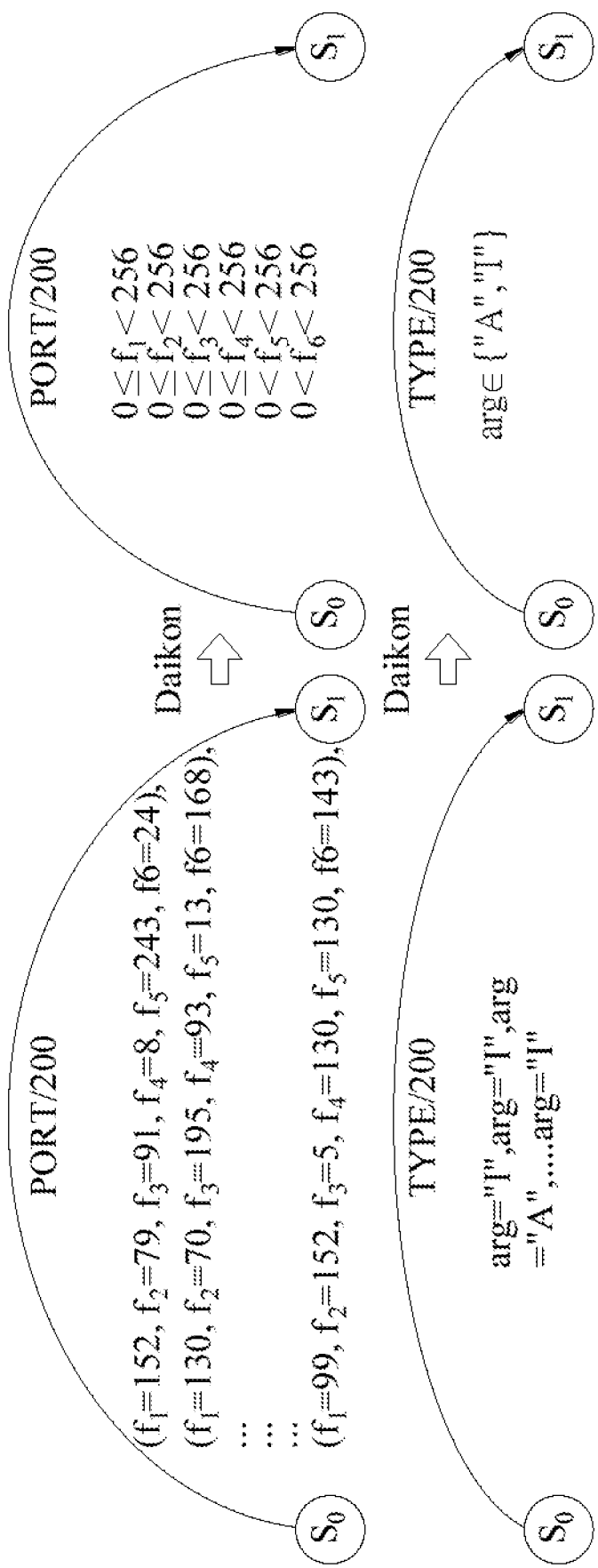
FIG. 8 is a schematic diagram illustrating the Daikon algorithm in accordance with the present disclosure.

Please refer to FIG. 8, which is a schematic diagram illustrating the Daikon algorithm in accordance with the present disclosure. As shown in the figure, Daikon worked on the sub-dataset of filed $f_1$ of PORT command data and found that the value of $f_1$ must be in range of (0, 255). Similarly, the arguments of TYPE command are in the enumerable set of {"A", "I"}. If this constraint is not verified, the machine reply code of 500 instead code of 200.

Principally, Daikon takes the raw execution traces or the values of variables as input and finds the best matching properties (rules) for all observed values of variables.

Step S504: Field dependencies detector. The field dependencies detector step searches the dependencies between fields in same message or cross messages. The term of inter-message dependency representing the relation of a field regulates the property of another field in different messages such as cookies (HTTP) and sequence number (TCP). An intra-message dependency is a correlation between fields within one message, for examples consistency fields as check-sum or direction field as length and offset.

In one implementation, the Pearson coefficient can be used to measure the strength of the dependency of all pair of attributes of fields and then apply Daikon on potential candidates to infer the relationships.

To fulfill the data guards function, the step continues to identify relations between fields in one or two messages. The basic idea is that we leverage the Pearson coefficient to measure the strength of the dependency of all pair of attributes of fields and then apply Daikon on potential candidates to infer the relationships.

The process consists of the field's value, its length, and its offset in the protocol message with the intention of capturing different kinds of relations. Besides, other fields such as IP address, port number are also taken into account. All observed pairs of field attributes are computed iteratively over sessions in traces.

Afterward, the Pearson product-moment correlation coefficient $\rho(X,Y)$ is computed based on each observed pair of field attributes (X,Y). The absolute value of $\rho(X,Y)$ indicate the strength of the linear relationship. If $|\rho(X,Y)|$ is closed to one, then there are generally linear relationship between X and Y. If the value is close to 0, they are mostly independent. For instance, the $|\rho|$ values of Content-Length and length attribute of data in HTTP protocol and IP address are one. This is because they are linear dependent. Finally, the step simplifies these dependencies by applying the Daikon algorithm such that a linear relationship of (Y=aX+ b) can be deduced. The step classifies the dependencies between fields in same message as the Itr function. For the dependencies between fields in two messages are classified as the Ite function.

Step S505: Memories inference. The memories inference step is to define the set of memories of EFSM model. The memories can be defined as values of fields which are kept in states for future interactions. The values of fields, such as the Ite function are representative of inter message dependencies. Alternatively, every field's values of previous message can be assigned as memories of states.

As mentioned before, we need to infer the 2-tuple ($\delta$, M) data guard and memories on each transition of the defined FSM. Now it is easy to infer data guard function $\delta$ by merging the Pr, Itr and Ite functions. Based on the steps described, we only need to update the memories in the state. The memories can be defined as values of fields which are kept in states for future interactions. The values of fields, such as the Ite function are representative of inter message dependencies. Alternatively, every field's values of previous message can be assigned as memories of states. However, the size of memories set will be huge after sequence of message. To reduce the size, we lay on the pair of inter-message dependencies. Initially, fields's values of every succeeding messages including the environment fields mentioned above are kept in the memory. Then, those values are eliminated if values are not used in the preceding messages. Once one of the dual field in the inter-message dependencies pairs appear in the future, the corresponding memory is kept. The remaining memories are the memories of state. Then the 6-tuple of EFSM is obtained.

In addition, a test sequence generation and a test data generation can be added to the automatic protocol test method. To generate conformance test cases, a simple test case generation prototype which takes the inferred EFSMs model as input is developed. In one embodiment, the unique input/output (UIO) can be used to generate the set of test sequences which guarantee that every state is checked at least one time. Since internal states observability are major issues, the unique input/output (UIO) sequence was widely used in testing domain. This technique generates the sequence of input and corresponding output which distinguishes a designated state from remaining states. The UIO method is used to generate the test sequences for every states of EFSM which are able to translate to test steps (or test scenario) later.

To test the data flow, the test suite for each state is generated by data value mutation on each input messages of UIO sequences. The value of each field (of the input messages) is designed to suffer possible case of the data guards (allow or does not allow the transition). The test data can be assigned to states or transitions in test sequences to complete the test case.

In order to evaluate the present extended finite state machine, four protocols of FTP, SMTP, and Bittorent are selected. The datasets of network traces are collected from publicly available and self-capture sources. The network traces consist of more than 210,000 messages of 1,800 sessions. However, these traces still contain malformed messages. Extra steps to eliminate illegal messages are needed. In order to measure the effectiveness of the proposed EFSM, several metrics are developed. Both of the pair-wise Precision and Recall values are used to evaluate the effectiveness of clustering algorithms for message type identification. For quality of inferred EFSM, the process uses the correctness and coverage score and proposes a new one to capture the powerfulness of EFSM compare to conventional FSM.

In the keywords analysis of the FTP protocol, the proposed EFSM detected all of the 26 commands in the server side. The remaining commands (total 33 commands according to those in RFC 959) cannot be extracted due to their absence in traces. The keywords analysis result of SMTP leads to the ideal precision score. However, the score of recall is 97% because there are two isolated clusters of EHLO and HELO messages miss-classified from the same cluster. On the contrary, the messages of BITFIELD and REQUEST in Bittorent protocol are similar and our method is unable to find the keywords to distinguish and merged them into one cluster. Thus, the precision is only 94% while recall is nearly perfect.

To compare with the existing works. AutoReEngine has been selected. AutoReEngine is applied with different thresholds on our dataset and kept the best results to compare. The result shows that the accuracy of the present method is improved. For all protocols, the values of pairwise precision and recall of EFSM are higher than those of AutoReEngine. The iterative keyword analysis is helpful to find the missing keywords of FTP. The K-means clustering algorithm is helpful to calibrate the issue of over-specific extracted keywords. Thus, both precision and recall values of FTP are considerably improved. For SMTP and Bittorent, EFSM still remains the same accuracy with AutoReEngine. It is because both of them share the main idea of keyword analysis and K-means does not help much in these cases. Even so, the present method outperforms AutoReEngine for most protocols in message type identification.

To evaluate the quality of the inferred EFSM, the impact of k-tails parameters on the conciseness of final EFSM is examined to discuss the correctness, coverage scores and behavior accuracy score. The number of states of our EFSM for each protocol dataset with the k-tails parameter shows that the EFSM models with our EFSM with k-tails=1 are concise at all protocols. The number of states in the ideal models of FTP, SMTP, Bittorent are 5, 8, 5 and 9. The k-tail merging mechanism significantly reduces number of states. The k-tail parameter impacts only to the conciseness, not to the quality of inferred models.

To judge coverage and correctness, the parameter of k-folds=5 is applied. It means that 20% of sessions are hold in traces to test. The ratio of accepted and rejected is 4:1. The results, confirm the quality of our FSM part of EFSM. The simplicity of SMTP and the richness of dataset are the reasons such that our inferred model can cover nearly 100% of specification and all valid sessions are accepted by the inferred model. Similarly, the coverage of Bittorrent is also high. The reasonable complexity of FTP with large set of commands lead to the lowest coverage of 91%. There are some commands (transitions) in test set randomly being neglected in training set so that the EFSM is not able to learn. The correctness score is never below 90% which guarantees that the learned models are close to the true models.

In the same way, k-folds=5 is used to calculate the behavior accuracy. Essentially, the EFSM relies on Daikon to generate the data guard including the valid syntax of data and the dependencies. Among many data constraints of FTP, the constraints on PORT command's arguments are significant. The first four numbers spitted by colon character should be mapped to IP address of server and the port number should be higher than 255. One of the detected data guards of Bittorent is that the first 20 bytes of hash_id should be consistent in both HANDSHAKE message.

In average, 89% of generated outputs of inferred EFSMs for FTP protocol match the expected outputs. In the meantime, the FSM without data guard and memories only correctly produce 78% of outputs. It means that the behavior of inferred model is nearly comparable to the true model on each state. The remaining errors are related to the information that is absent in traces.

The present disclosure adopted the EFSM, a static analysis methodology that infers the behavior models of protocols in the form of EFSMs from network traces. The inferred models have been equipped with the constraints on data values (as known as data guards). Those constraints are deduced by Daikon from samples and memories which are derived by correlation analysis technique. Furthermore, the EFSM leverages the K-tail mechanism to enhance the accuracy of classical FSM (control flow) operation.

While the means of specific embodiments in present disclosure has been described by reference drawings, numerous modifications and variations could be made thereto by those skilled in the art without departing from the scope and spirit of the disclosure set forth in the claims. The modifications and variations should be in a range limited by the specification of the present disclosure.

What is claimed is:

1. An automatic protocol test method by reverse engineering from packet traces to extended finite state machine, the automatic protocol test method comprising following steps of:

inputting traffic traces containing a plurality of packets in sequence;

parsing the plurality of packets to extract a plurality of sessions and reconstructing the plurality of sessions to obtain protocol messages;

conducting a keyword analysis and a clustering algorithm to the protocol messages to identify a plurality of message types;

initializing the protocol messages to form initial session sequences and merging equivalent states to obtain a finite state machine with a set of states, a set of transitions, a set of inputs and a set of outputs;

extracting fields and values of the protocol messages to obtain a plurality of sub-datasets and adding constraints on the fields to generate a data guard, the data guard and set of memories being inferred on the finite state machine to obtain the extended finite state machine.

2. The automatic protocol test method of claim 1, wherein the plurality of packets are parsed according to a source address, a source port, a destination address, a destination port and a type of transport layer protocol.

3. The automatic protocol test method of claim 1, wherein the keyword analysis comprises an Apriori keyword analysis to find high frequency and close sequence string.

4. The automatic protocol test method of claim 1, wherein the clustering algorithm comprises a K-means clustering algorithm based on distances.

5. The automatic protocol test method of claim 1, wherein the initial session sequences are arranged with different paths by a Prefix Tree Acceptor.

6. The automatic protocol test method of claim 1, wherein the equivalent states are merged by same k-tail transitions.

7. The automatic protocol test method of claim 1, wherein the protocol messages are processed by a Needleman and Wunch sequence alignment to extract the fields.

8. The automatic protocol test method of claim 1, wherein the values of the fields in the protocol messages are hold over by a Daikon algorithm to infer the constraints.

9. The automatic protocol test method of claim 1, wherein the constraints on the fields comprises checking valid value of the fields, intra-message dependencies and inter-message dependencies.

* * * * *